Figure 1:
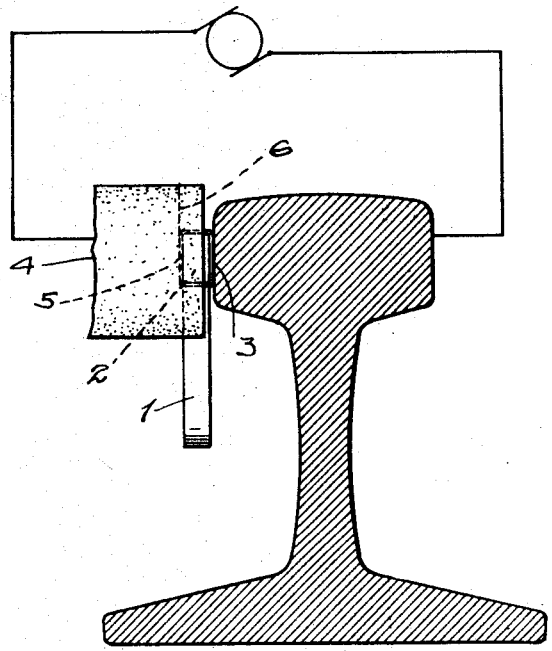
Figure 1A:
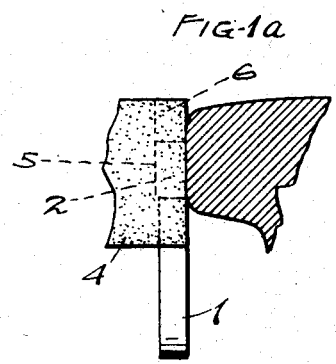

A. B. HERRICK.
METHOD OF AND ELECTRODE FOR WELDING BONDS TO RAILS.
APPLICATION FILED NOV. 29, 1912. RENEWED JUNE 23, 1915.

1,211,313.

Patented Jan. 2, 1917.
2 SHEETS—SHEET 1.

WITNESSES=
Oliver M. Kappler
Anna L. Gill

INVENTOR
Albert B. Herrick
BY Fay and Oberlin
ATTORNEYS

A. B. HERRICK.
METHOD OF AND ELECTRODE FOR WELDING BONDS TO RAILS.
APPLICATION FILED NOV. 29, 1912. RENEWED JUNE 23, 1915.

1,211,313.

Patented Jan. 2, 1917.
2 SHEETS—SHEET 2.

WITNESSES=
Oliver M. Kappler.
Anna L. Gill

INVENTOR
Albert B. Herrick
BY Jay Ed Oberlin
ATTORNEYS—

UNITED STATES PATENT OFFICE.

ALBERT B. HERRICK, OF NEW YORK, N. Y., ASSIGNOR TO THE ELECTRIC RAILWAY IMPROVEMENT COMPANY, OF CLEVELAND, OHIO, A CORPORATION OF OHIO.

METHOD OF AND ELECTRODE FOR WELDING BONDS TO RAILS.

1,211,313. Specification of Letters Patent. Patented Jan. 2, 1917.

Application filed November 29, 1912, Serial No. 733,974. Renewed June 23, 1915. Serial No. 35,938.

*To all whom it may concern:*

Be it known that I, ALBERT B. HERRICK, a citizen of the United States, and a resident of New York, county of New York, and State of New York, have invented a new and useful Improvement in Methods of and Electrodes for Welding Bonds to Rails, of which the following is a specification, the principle of the invention being herein explained and the best mode in which I have contemplated applying that principle, so as to distinguish it from other inventions.

In my Patent No. 1,012,077, issued to me December 19, 1911, for a method of making homogeneous mechanical junctures, I describe a method of electrically or otherwise welding together metal bodies having unlike characteristics as to fusibility, the more readily fusible body having also the greater heat conductivity, which method consists in holding said bodies in contact at the desired point of union and thereupon applying heat to that side of the joint only on which the first, or more readily fusible body, is located, whereby said more readily fusible body and the contacting face of the other body are brought to a welding temperature practically simultaneously. As explained in the aforesaid patent this process is particularly adaptable for the welding of small, relatively fusible bodies, such as "bonds", to larger bodies of higher fusing temperature, such as steel rails, as is necessary in the construction of electric railways in order to render the rails satisfactory electric conductors for the ground return circuit.

As disclosed in the patent named, and as extensively employed in practice, a flat electrode brought to bear against the outer face of the bond terminal and raised to a sufficiently high temperature to provide the necessary external source of heat, has been used to furnish the required external source of heat. In my Patent No. 1,046,464, dated December 10, 1912, I have shown and described a modification in the construction of this electrode, wherein the electrode is recessed to receive the bond terminal and contacts with the face of the rail, or equivalent larger body of higher fusibility, at points laterally contiguous to such bond terminal, or first more fusible body, the object being to heat such laterally contiguous portions of the rail face at the same time that the bond terminal is being brought to a welding temperature.

In the present improved process I propose to utilize a recessed electrode similarly adapted to inclose the bond terminal, but shallower than the latter, so that initially said electrode will not be adapted to contact with the rail face but only be brought thus in contact with the latter after the bond terminal has been brought substantially to a state of fusion in which state it will be compressed or "squashed" sufficiently to allow the electrode under the continuing pressure which is applied thereto to contact with the rail at points laterally contiguous to said bond terminal.

Instead of a separate electrode adapted to be brought up to the bond terminal, and having a recess adapted to receive such terminal in the fashion just described, I may utilize a high resistance medium molded, or otherwise more or less permanently attached directly to the terminal, as described in United States Letters Patent No. 987,136, granted to me March 21, 1911. The material thus attached to the bond head, however, will not extend around its edges so as to lie flush with the contact face of the head as in said patent, but stop a trifle short thereof, just as in the case of the separate electrode first mentioned above.

In the present improved process the contacting of the electrode with the rail is not relied on necessarily to additionally heat such rail face at the points adjacent to the terminal where such contact occurs; rather such contact marks the conclusion of the welding operation, a current being used of such character that when this additional contact is thus afforded the heat applied to the bond terminal will be decreased by the diversion of current and the latter allowed to set, so that the electrode may be presently removed following its being brought into contact with the rail. In other words, whichever form of electrode be employed, the contact of such electrode with the face of the rail cannot take place until the projecting bond head has become plastic, or flowing, in the recess in such electrode and a homogeneous weld made with the rail head or other surface with which the bond terminal is to be amalgamated.

The detailed steps and means employed in such improved process will now be fully described and then specifically set forth in the claims which follow.

The annexed drawings and the following description set forth in detail certain steps and mechanism embodying the invention, such disclosed means constituting, however, but several of the various mechanical ways in which the principle of the invention may be used.

Figure 2:
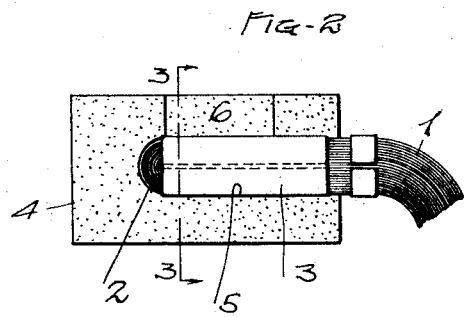
Figure 4:
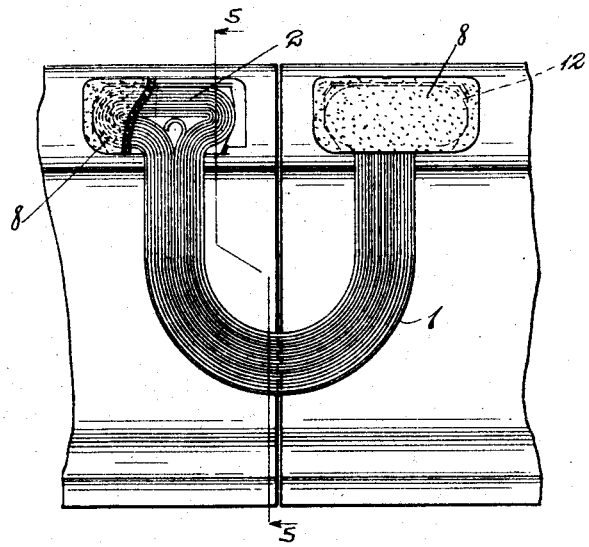
Figure 5:
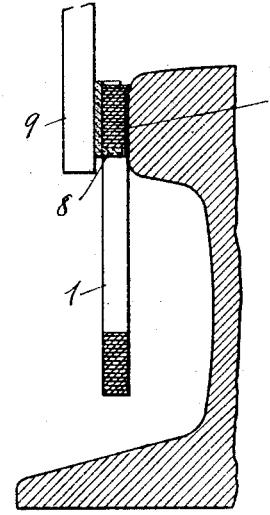
Figure 6:
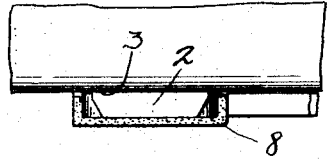
Figure 3:
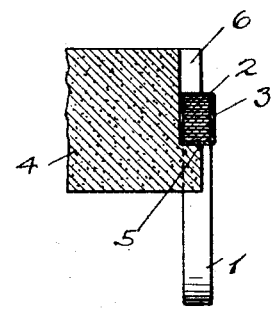

In said annexed drawings: Figure 1 represents a vertical transverse cross-section of a standard steel rail and a bond applied thereto and in position for the bonding process, an electrode of the separable type suitable for carrying on the present improved process being illustrated, and the necessary electrical connections being diametrically shown; Fig. 1ᵃ represents the rail, bond and electrode, as in Fig. 1, save that the parts are here shown in section and as they appear following the fusion of the bond terminal, in which condition the electrode is moved into contact with the rail; Fig. 2 is an end elevation of the recessed end of the electrode showing a portion of a typical form of bond with its terminal properly inserted therein; Fig. 3 is a section on line 3—3 of Fig. 2; Fig. 4 is a side elevation of two abutting rails, showing a form of attached, or molded, electrode, adapted for use in the present process; Fig. 5 is a vertical section of such bond and rail with other appurtenant parts employed in carrying on the process; and Fig. 6 is a plan view of the foregoing.

The form of bond 1 shown in connection with the foregoing figures is intended to be merely typical, being composed of laminated strands and having a general U-shape. Said bond is furthermore shown as having its terminal 2 provided with a sheet 3 of braze, or like material, on the face which is designed to contact with the rail. This, however, is optional so far as the novel features of the present process are concerned.

In the case of the separable electrode 4, shown in Figs. 1 to 3 inclusive, the recess 5 in the electrode is of substantially the form and size of the bond terminal, as shown in Fig. 2, but a trifle shallower, so that the rail-contacting face of such terminal when the latter is received in the recess, will project a short distance without the recess as shown in Fig. 1, and also more clearly in Fig. 3. The recess 5 is preferably open above, as at 6, thereby permitting additional material to be inserted into the recess and there melted after the bond terminal has been fused, or on the other hand providing for the escape of any excess of material produced by such melting of the terminal. The lower portion of the electrode, that is the portion below the bond terminal, may also be formed to project as a lip that coöperates with the under surface of the rail head to initially confine the terminal of the bond along this edge, even before said terminal begins to melt, thus insuring against any of the metal of the terminal from escaping.

In utilizing the foregoing electrode, it will be evident that when the latter is pressed against the bond terminal, thus located in the recess in said electrode's forward end, so as to in turn press the projecting face of said terminal against the rail, and the necessary heating current is passed through said electrode, in the fashion described in my aforesaid Patent No. 1,012,077, the initial effect (neglecting the interposed strip of braze), is to cause the electrode to be highly heated. Such heat is in turn transmitted by conduction through the bond, and strip of braze, to the contacting face of the rail, so that by the time the bond terminal is fused such rail face becomes heated and softened to a sufficient extent to form a homogeneous union or weld with the metal of the terminal, which will usually be copper. Immediately, however, the bond terminal becomes sufficiently heated to be soft or plastic, it will, under the pressure of the electrode, spread or be squeezed out enough to allow the end of said electrode to come in contact with the rail face as shown in Fig. 1ᵃ. The diversion of current thus produced will permit the lowering of the general temperature of the terminal, and this can be regulated so that the latter may actually begin to harden. It will, however, be obviously molded to the shape of the recess in the electrode and cannot by any possibility be flattened or pressed out to a degree which would render the electrical connection through the bond inadequate or less than might be expected from its normal cross-section.

The form of electrode illustrated in Figs. 4, 5 and 6, need only be briefly described, inasmuch as the same constitutes the subject matter of a separate divisional application filed by me April 29, 1915, Serial No. 24,708. Such electrode may be formed by mixing carbon in suitable form, together with a suitable binder material, or materials, applying the same in plastic condition to the bond terminal, and then molding them to inclose said terminal in the fashion shown in the figures in question. After baking, or otherwise hardening, the applied mass, a matrix 8 is formed, the edges of which stop short of the inner face of the bond terminal, and the upper portion of which is open, substantially the same as in the case of the separable electrode. In using this second form of apparatus, a movable electrode 9, preferably of metal, is brought to bear against the outer face of the matrix 8 and a suitable electric current passed therethrough.

Irrespective of the particular form of apparatus employed, it will be seen that the electrode functions in a unique and highly useful fashion. As soon as the bond head becomes sufficiently plastic to yield to the pressure applied to the electrode, or molded matrix, as the case may be, the edges of the latter surrounding said head, or terminal, come into contact with the rail surface and thereby shunt the current from its path through the molten bond head to a more direct path to the rail through the portions of the electrode contacting with the latter's face. The molten head of the bond is thus made to conform with the recess in the electrode without further manipulation thereof. The shape of this bond-head-containing recess may be a compromise between the head of the bond and the shape of the rail head or surface, to which the bond is to be welded. If there is not enough metal provided by the fused bond head to properly fill the container, more can be supplied through the opening in the upper edge of the container, or electrode, or, if an excess of metal occurs, this may be expelled through the same opening. The shape of the container, furthermore, can be made such that the relation of the welded bond head and the surface to which it is joined will give the maximum conductivity through the welded junction.

With a flat resistance electrode clamping the bond head against the rail surface, the finished, welded laminæ of the bond will be left with a cross-section determined by the final position of said electrode, and if the latter is not carefully manipulated, while the bond head is under heat, the head will be pressed or "squashed" too flat, so that the stranding of the body of the bond has its cross-section reduced at its junction with the head. Thus the conducting capacity of the bond is reduced, frequently to a degree that renders the connection entirely inadequate. So, too, unless the flat type of electrode be made to follow and keep in contact with the fused bond head, the latter, upon becoming molten, will entirely run away from between the electrodes and the rail face, thus rendering the whole bond worthless. The present method obviates these several difficulties and renders the application of bonds to rails, or in general the welding together electrically of similar articles, a much simpler operation and one not calling for such skill and expert manipulation on the part of the operator in order to obtain the best possible results, and the article that is being welded can be given a predetermined form depending upon the form of the container, depression or matrix in which it is welded, and the character of the resultant contact be not left to the caprice of the operator.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of homogeneously uniting metal bodies, which consists in holding said bodies in contact at the desired point of union; directly heating one of said bodies by pressing against the same an electrode of high resistance and thereupon passing a heating current through said electrode and said two bodies in series until said first body and the contacting face of the second body are brought to a welding temperature; and then bringing said electrode into contact with said second body, whereby a portion of such current is passed directly through said electrode and second body, substantially as described.

2. The method of homogeneously uniting metal bodies having unlike characteristics as to fusibility, the more readily fusible body having also the greater heat conductivity; which consists in holding said bodies in contact at the desired point of union; directly heating the first or more readily fusible body by pressing against the same an electrode of high resistance and thereupon passing a heating current through said electrode and said two bodies in series until said first body and the contacting face of the second body are brought to a welding temperature; and then bringing said electrode into contact with said second body, whereby a portion of such current is passed directly through said electrode and second body, substantially as described.

3. The method of homogeneously uniting metal bodies of unlike masses and different temperatures of fusion, the smaller body having both the lower temperature of fusion and the greater heat conductivity; which consists in holding said bodies in contact at the desired point of union; directly heating said smaller body by pressing against the same an electrode of high resistance and thereupon passing a heating current through said electrode and said two bodies in series until said first body and the contacting face of the second body are brought to a welding temperature; and then bringing said electrode into contact with said second body, whereby a portion of such current is passed directly through said electrode and second body, substantially as described.

4. The method of homogeneously uniting metal bodies of unlike masses and different temperatures of fusion, the smaller body having both the lower temperature of fusion and the greater heat conductivity; which consists in holding said bodies in contact at the desired point of union; directly heating said smaller body by pressing against the same an electrode of high resistance and thereupon passing a heating electric current through said electrode and said two bodies in series until said first body is substantially fused and the contacting face of the second body brought to a welding temperature; and then continuing the pressure on said electrode to bring the same into contact with said second body at points laterally contiguous to said first body, whereby a portion of such current is passed directly through said electrode and second body, substantially as described.

5. The method of homogeneously uniting a bond to a rail, which consists in holding the bond in contact with the rail at the desired point of union; directly heating said bond by pressing against the same an electrode of high resistance and thereupon passing a heating current through said electrode and said bond and rail in series until said bond and the contacting face of said rail are brought to a welding temperature; and then bringing said electrode into contact with said rail, whereby a portion of such current is passed directly through said electrode and rail, substantially as described.

6. The method of homogeneously uniting a bond to a rail, which consists in holding the bond in contact with the rail at the desired point of union; directly heating said bond by pressing against the same an electrode of high resistance and thereupon passing a heating current through said electrode and said bond and rail in series until said bond is substantially fused and the contacting face of said rail brought to a welding temperature; and then continuing the pressure on said electrode to bring the same into contact with the rail at points laterally contiguous to said bond, whereby a portion of the current is passed directly through said electrode and second body, substantially as described.

7. The method of homogeneously uniting metal bodies, which consists in holding said bodies in contact at the desired point of union; directly heating one of said bodies by pressing against the same a suitable member and raising said member to a high temperature so as to fuse the body wherewith said member thus contacts; and limiting the movement of said member toward said other body, substantially as described.

8. The method of homogeneously uniting metal bodies, which consists in holding said bodies in contact at the desired point of union; directly heating one of said bodies by pressing against the same a suitable member and raising said member to a high temperature so as to fuse the body wherewith said member thus contacts; and limiting the movement of said member toward said other body, the contacting face of said member being formed to inclose said first body when fused and to mold the same substantially as described.

9. An electrode for electric welding comprising a body of high resistance material adapted to serve as a heater, said body having a face adapted to contact with one of the articles to be welded and provided with a recess in such face substantially conforming in shape with the other article to be welded, but shallower, whereby such article will project beyond the face of such electrode.

10. An electrode for electric welding comprising a body of high resistance material adapted to serve as a heater, said body having a face adapted to contact with one of the articles to be welded and provided with a recess in such face substantially conforming in shape with the other article to be welded, but shallower, whereby such article will project beyond the face of such electrode, and an opening extending from the upper side of said body to such recess.

11. The method of homogeneously uniting metal bodies, which consists in holding said bodies in contact at the desired point of union; directly heating one of said bodies by pressing against the same an electrode of high resistance and thereupon passing a heating current through said electrode and said two bodies in series; and automatically varying the heating action of such electrode in accordance with the temperature of such first body.

12. The method of homogeneously uniting metal bodies, which consists in holding said bodies in contact at the desired point of union; directly heating one of said bodies by pressing against the same an electrode of high resistance and thereupon passing a heating current through said electrode and said two bodies in series; and automatically decreasing the heating action of such electrode when such first body is brought to the proper temperature.

13. The method of homogeneously uniting metal bodies, which consists in holding said bodies in contact at the desired point of union; directly heating one of said bodies by pressing against the same an electrode of high resistance and thereupon passing a heating current through said electrode and said two bodies in series; and automatically decreasing the heating action of such electrode when such first body becomes plastic.

14. The method of homogeneously uniting metal bodies, which consists in holding said bodies in contact at the desired point of union; directly heating one of said bodies by pressing against the same an electrode of high resistance and thereupon passing a heating current through said electrode and said two bodies in series; and automatically shunting a portion of such current from said electrode directly to such second body when the first body is brought to the proper temperature.

Signed by me, this 26th day of November, 1912.

ALBERT B. HERRICK.

Attested by—
D. L. DAVIES,
JNO. F. OBERLIN.

Copies of this patent may be obtained for five cents each, by addressing the "Commissioner of Patents, Washington, D. C."